(12) United States Patent
Choi et al.

(10) Patent No.: US 12,583,483 B2
(45) Date of Patent: Mar. 24, 2026

(54) SYSTEM AND METHOD FOR CONVERTING DRIVING CONTROL RIGHTS IN AUTONOMOUS VEHICLES

(71) Applicants: Hyundai Motor Company, Seoul (KR); Kia Corporation, Seoul (KR)

(72) Inventors: Eun Young Choi, Whasung-Si (KR); Woo Jin Kim, Whasung-Si (KR); Ki Seok Seong, Whasung-Si (KR); Dong IL Yang, Whasung-Si (KR); Da Ye Pyun, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 190 days.

(21) Appl. No.: 18/216,428

(22) Filed: Jun. 29, 2023

(65) Prior Publication Data

US 2024/0124032 A1 Apr. 18, 2024

(30) Foreign Application Priority Data

Oct. 18, 2022 (KR) ........................ 10-2022-0133898

(51) Int. Cl.
| | |
|---|---|
| *B60W 60/00* | (2020.01) |
| *B60W 40/02* | (2006.01) |
| *B60W 40/09* | (2012.01) |

(52) U.S. Cl.
CPC ........ *B60W 60/0051* (2020.02); *B60W 40/02* (2013.01); *B60W 40/09* (2013.01); *B60W 60/0053* (2020.02); *B60W 2540/223* (2020.02); *B60W 2540/225* (2020.02); *B60W 2556/10* (2020.02)

(58) Field of Classification Search
CPC ......... B60W 60/0051; B60W 60/0053; B60W 40/02; B60W 40/09; B60W 2556/10; B60W 2540/225; B60W 2540/223
See application file for complete search history.

(56) References Cited

U.S. PATENT DOCUMENTS

| | | | | |
|---|---|---|---|---|
| 2021/0291839 A1* | 9/2021 | Hutchings | ................ | A61B 5/18 |
| 2024/0326876 A1* | 10/2024 | Sasayama | ................ | G08G 1/16 |

FOREIGN PATENT DOCUMENTS

| | | | | | |
|---|---|---|---|---|---|
| JP | 2021046063 A | * | 3/2021 | | |
| KR | 101984284 B1 | * | 5/2019 | ............. | G06N 20/00 |

OTHER PUBLICATIONS

JP2021046063A machine translation (Year: 2021).*
KR101984284B1 machine translation (Year: 2019).*

* cited by examiner

*Primary Examiner* — Navid Z. Mehdizadeh
*Assistant Examiner* — Oliver Tan
(74) *Attorney, Agent, or Firm* — MORGAN, LEWIS & BOCKIUS LLP

(57) ABSTRACT

An automated driving system of a vehicle includes a driver monitoring unit configured to perform at least one of monitoring a gaze of a driver and determining a position of a hand of the driver, an automated-driving-level switching unit configured to determine whether a transition of a driving control over the vehicle is required based on whether driving environment of the vehicle has changed during the vehicle being driven under control of the automated driving system, and determine an automated driving level to be switched based on a driver monitoring result obtained by the drive monitoring unit, and an automated driving control unit configured to control the vehicle according to the automated driving level.

15 Claims, 5 Drawing Sheets

FIG. 4

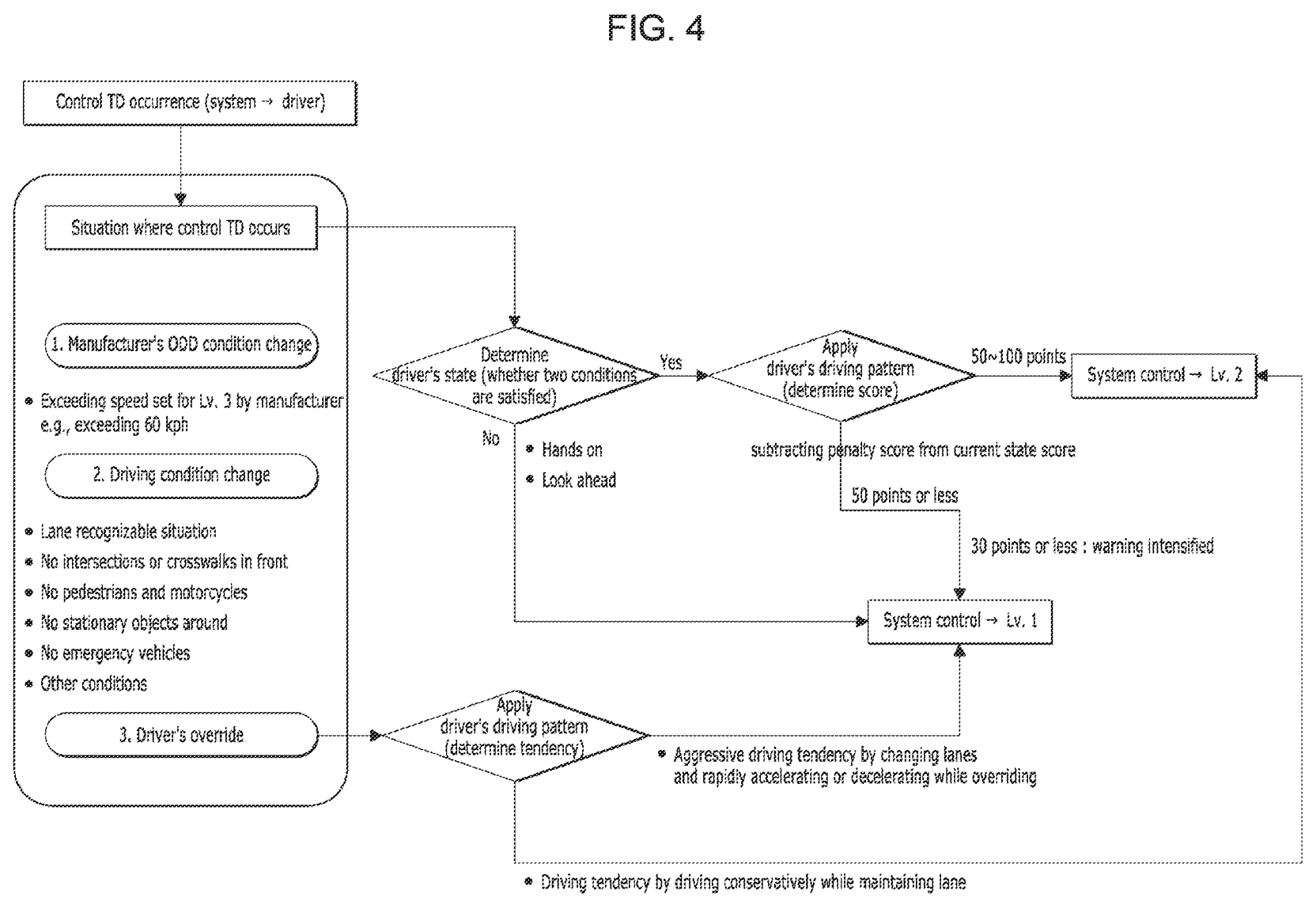

Control TD occurrence (system → driver)

Situation where control TD occurs

1. Manufacturer's ODD condition change
- Exceeding speed set for Lv. 3 by manufacturer
  e.g., exceeding 60 kph

2. Driving condition change
- Lane recognizable situation
- No intersections or crosswalks in front
- No pedestrians and motorcycles
- No stationary objects around
- No emergency vehicles
- Other conditions

3. Driver's override

Determine
driver's state (whether two conditions
are satisfied)

Yes

No
- Hands on
- Look ahead

Apply
driver's driving pattern
(determine score)

50~100 points

System control → Lv. 2 subtracting penalty score from current state score 50 points or less 30 points or less : warning intensified System control → Lv. 1

Apply
driver's driving pattern
(determine tendency)

- Aggressive driving tendency by changing lanes
  and rapidly accelerating or decelerating while overriding

- Driving tendency by driving conservatively while maintaining lane

S100 — Determine necessity for transition of control

S200 — Determine state of driver

S300 — Derive driving pattern

S400 — Determine an automated driving level to be switched

S410 — Apply driving pattern

S420 — Apply override

S500 — Display the automated driving level

S600 — Transfer of the driving control over the vehicle

SYSTEM AND METHOD FOR CONVERTING DRIVING CONTROL RIGHTS IN AUTONOMOUS VEHICLES

CROSS-REFERENCE TO RELATED APPLICATION

The present application claims priority to Korean Patent Application No. 10-2022-0133898, filed on Oct. 18, 2022, the entire contents of which is incorporated herein for all purposes by this reference.

BACKGROUND OF THE PRESENT DISCLOSURE

Field of the Present Disclosure

The present disclosure relates to a control transition system and method for an autonomous vehicle that, when an automated driving control for an autonomous vehicle is transferred from an automated driving system of the vehicle to a driver of the vehicle, determines an automated driving level based on a current state or a past driving pattern of the driver and informs the driver of this, transferring the automated driving control according to a response situation of the driver.

Description of Related Art

In general, an automated driving level is classified into a total of six levels from level 0 to level 5 (Lv.0, Lv.1, Lv.2, Lv.3, Lv.4, and Lv.5) to be applied to autonomous vehicles.

In the instant case, level 0 (Lv. 0) refers to a non-automated level at which a system is used sub sidiarily only in an emergency while a driver is driving at all times; level 1 (Lv. 1) refers to a driver assisting level at which driving speed and direction of the vehicle are under control of the driver while only specific functions such as speed or lane keeping are under control of the automated driving system; and level 2 (Lv. 2) refers to a partially automated level at which the driver is always required to focus on a situation around the driver while steering and acceleration/deceleration of the vehicle is under control of the automated driving system under specific conditions.

Furthermore, level 3 (Lv. 3) refers to a conditionally automated level at which a vehicle is controlled by the system and thus active intervention of the driver is not required while driving, but is required in case of danger; level 4 (Lv. 4) refers to a highly automated level at which automated driving by the system is available in all situations on a road without the intervention of the driver; and level 5 (Lv. 5) refers to a fully automated level at which driving is available only with passengers onboard without the driver.

In the instant case, at level 3 (Lv. 3), the system proactively controls the vehicle to drive, but in case of an unexpected situation, such as a sudden situation, an automated driving control for controlling the vehicle needs to be transferred from the system to the driver. Accordingly, the automated driving level may need to be switched from level 3 (Lv. 3) to level 1 (Lv. 1) or level 2 (Lv. 2).

Accordingly, when the automated driving level is switched, a subject that drives the vehicle is changed from the system to the driver, and the driver needs to recognize an accurate level to which the automated driving level is to be switched. There are, however, two possible levels to which the level is switched, which may confuse the driver.

Switching the automated driving level may mostly occur in an unexpected sudden situation, and it may thus be more important for the driver to recognize an accurate level to which the automated driving level is to be switched.

To prevent such confusion, some countries, such as European countries, force automated driving of level 3 or higher to be unconditionally switched to level 1 (Lv. 1) by law.

However, when the level is switched to a specific one, for example, level 1 (Lv. 1), as forced by related regulations or programs, the overall control of the vehicle depends on the driver even when the driver has not yet completely taken over the control for the vehicle, and thus the driver may not be able to respond properly.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure is directed to providing a control transition system and method for an autonomous vehicle that, when the control for the autonomous vehicle is transferred from the automated driving system to the driver of the vehicle, determines an automated driving level based on a current state or a past driving pattern of the driver and informs the driver of the determined automated driving level, transferring the automated driving control according to a response of the driver.

According to an exemplary embodiment of the present disclosure, an automated driving system of a vehicle includes a driver monitoring unit configured to perform at least one of monitoring a gaze of a driver and determining a position of a hand of the driver, an automated-driving-level switching unit configured to determine whether a transition of a driving control over the vehicle is required based on whether driving environment of the vehicle has changed during the vehicle being driven under control of the automated driving system, and determine an automated driving level to be switched based on a driver monitoring result obtained by the drive monitoring unit, and an automated driving control unit configured to control the vehicle according to the automated driving level.

The automated driving system may further include a driving environment recognition unit configured to recognize the driving environment using at least one sensor provided in the vehicle or map information.

The automated driving system may further include a driving pattern determining unit configured to determine a driving pattern of the driver based on a driving history of the driver associated with level 3 or higher than the level 3, wherein the level 3 is an automated driving level at which the automated driving system proactively controls the vehicle without the two conditions not being satisfied, but the automated driving system is configured to request a take-over of the control of the vehicle by the driver.

The driving pattern determining unit may be further configured to determine the driving pattern of the driver based on whether there is a change in acceleration or deceleration according to operation of an accelerator or a brake pedal of the driver and a change in a steering angle according to operation of a steering wheel of the driver when a driving control of the automated driving system over the vehicle is terminated.

The driving pattern determining unit may be further configured to store an occurrence history of a control transition demand (TD) in a data storage system for automated driving (DSSAD) whenever the control TD occurs.

The driving pattern determining unit is further configured to determine a penalty score based solely on the occurrence history of the control TD which is occurred due to a fault of the driver when the vehicle is a fleet vehicle and data stored in the DSSAD is able to be associated with information of the driver.

The automated-driving-level switching unit may include a control transition determiner configured to determine to transfer the control for the vehicle from the automated driving system to the driver, a driver-state determiner configured to determine whether the driver is in a state where the driver is able to take over the control for the vehicle based on the driver monitoring result, and a switching-level determiner configured to determine the automated driving level to be level 1 when any one of two conditions that the gaze of the driver is directed forward and that the hand of the driver is on a steering wheel is not satisfied based on the driver monitoring result, and determine the automated driving level to be level 2 when both of the two conditions are satisfied, wherein the level 1 is a driver assisting level at which driving speed and direction of the vehicle are under control of the driver while predetermined functions including speed or lane keeping are under control of the automated driving system, and the level 2 is a partially automated level at which the driver is always required to focus on a situation around the driver while steering and acceleration/deceleration of the vehicle is under control of the automated driving system under predetermined conditions.

The automated-driving-level switching unit may further include a driving pattern applier configured to adjust the automated driving level based on the driving pattern of the driver.

The driving pattern applier may be configured to determine the automated driving level to be the level 2 when a first score determined by subtracting a penalty score determined by the driving pattern determining unit based on a driving history of the driver from a predetermined reference score exceeds a preset value, and adjust the automated driving level to be the level 1 when the first score is less than or equal to the preset value.

The automated-driving-level switching unit may further include an override determiner configured to determine an automated driving level based on tendency information of the driver which is stored by the driving pattern determining unit when there is a control TD occurred due to the driver's overriding the automated driving system while the vehicle being driven in the level 3 or higher than the level 3.

The override determiner may be further configured to determine the automated driving level to be the level 1 when it is determined that the driver has an aggressive driving tendency to change lanes or rapidly accelerate or decelerate while overriding, and determine the automated driving level to be the level 2 when it is determined that the driver has a defensive driving tendency to drive conservatively while keeping a lane.

The automated driving system may further include an automated-driving-level display unit configured to display information on the automated driving level through an audio video navigation (AVN) system, a cluster, or a head-up display (HUD) provided in the vehicle.

A control transition method for a vehicle, according to an exemplary embodiment of the present disclosure, includes determining to transfer a control over the vehicle from an automated driving system to a driver of the vehicle based on a state of the vehicle and a driving environment around the vehicle, determining a current state of the driver by monitoring a gaze of the driver and determining a position of a hand of the driver according to a result of the determining to transfer the control, and determining an automated driving level to be switched based on a result of the monitoring in the determining of the current state of the driver.

The control transition method may further include determining a driving pattern of the driver based on a driving history of the driver associated with level 3 or higher than the level 3, wherein the level 3 is an automated driving level at which the automated driving system proactively controls the vehicle without the two conditions not being satisfied, but the automated driving system is configured to request a take-over of the control of the vehicle by the driver.

The deriving of the driving pattern may include assigning a preset penalty when there is a control transition demand (TD) occurred due to a fault of the driver during the vehicle being driven under control of the automated driving system in the past, assigning a predetermined reference score as a score of the driving pattern of the driver, subtracting from the predetermined reference score a preset value each time the penalty is assigned, and using a remaining score after the subtracting as a criterion for determining a current driving pattern of the driver.

The deriving of the driving pattern may include determining the driving pattern of the driver based on whether the driver has an aggressive driving tendency to change lanes or rapidly accelerate or decelerate while overriding during automated driving, or the driver has a defensive driving tendency to drive conservatively while keeping a lane.

The determining of the automated driving level includes determining the automated driving level to be level 1 when any one of two conditions that the gaze of the driver is directed forward and that the hand of the driver is on a steering wheel is not satisfied, and determining the automated driving level to be level 2 when both of the two conditions are satisfied, wherein the level 1 is a driver assisting level at which driving speed and direction of the vehicle are under control of the driver while predetermined functions including speed or lane keeping are under control of the automated driving system, and the level 2 is a partially automated level at which the driver is always required to focus on a situation around the driver while steering and acceleration/deceleration of the vehicle is under control of the automated driving system under predetermined conditions.

The determining of the automated driving level further includes applying the driving pattern to adjust the automated driving level based on the driving pattern of the driver, or applying an override to adjust the automated driving level based on an override driving tendency of the driver.

The applying of the driving pattern includes determining the automated driving level to be the level 2 when a first score determined by subtracting a penalty score determined based on the driving history of the driver from a reference score assigned to a state where the two conditions are satisfied exceeds a preset value, and adjusting the automated driving level to be the level 1 when the first score is less than or equal to the preset value.

The applying of the override includes determining the automated driving level to be the level 1 when it is determined that the driver has an aggressive driving tendency to change lanes or rapidly accelerate or decelerate while overriding frequently, and determining the automated driving level to be the level 2 when it is determined that the driver has a defensive driving tendency to drive conservatively while keeping a lane.

The control transition method may further include displaying the automated driving level by displaying information on the automated driving level through an Audio, Video and Navigation (AVN) system, a cluster, or a HUD provided in the vehicle, and after switching the automated driving level of the vehicle to the determined automated driving level, transferring the automated driving control that restrictively controls the vehicle within a range of the switched automated driving level.

A non-transitory computer-readable storage medium according to an exemplary embodiment of the present disclosure stores a program for executing the control transition method as described above.

According to various embodiments of the present disclosure as described above, when an automated driving level is switched to a level that requires a transition of a vehicle control to a driver during automated driving of level 3 or higher than the level 3, it is possible to induce the transition to the automated driving level suitable for a situation and a driving pattern of the driver and ensure driving safety.

Furthermore, allowing the driver to be aware of the switched automated driving level in various ways may minimize confusion which may occur when the driver who has not been involved in driving takes over the vehicle control.

Additional advantages, objects, and features of the present disclosure will be set forth in part in the description which follows and in part will become apparent to those having ordinary skill in the art upon examination of the following or may be learned from practice of the present disclosure. The objects and other advantages of the present disclosure may be realized and attained by the structure particularly pointed out in the written description and claims hereof as well as the appended drawings.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a flowchart illustrating a process of determining a control transition level for an autonomous vehicle according to an exemplary embodiment of the present disclosure.

Figure 1:
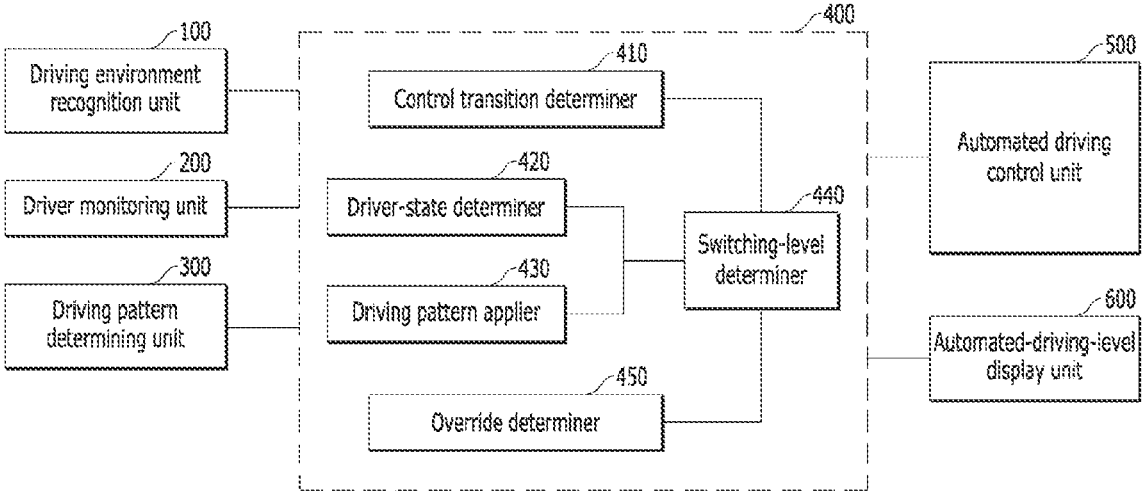
FIG. 1 is a block diagram illustrating a configuration of a control transition system for an autonomous vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings, and the same or similar elements will be provided the same reference numerals regardless of reference symbols, and a redundant description thereof will be omitted. In the following description, the terms "module" and "unit" for referring to elements are assigned and used interchangeably in consideration of convenience of explanation, and thus the terms per se do not necessarily have different meanings or functions. Furthermore, in describing the exemplary embodiments described herein the present disclosure, when it is determined that a detailed description of related publicly known technology may obscure the gist of the embodiments, the detailed description thereof will be omitted. The accompanying drawings are used to help easily explain various technical features, and it should be understood that the exemplary embodiments presented herein are not limited by the accompanying drawings.

Accordingly, the present disclosure should be construed to extend to any alterations, equivalents, and substitutes in addition to those particularly set out in the accompanying drawings.

Although terms including ordinal numbers, such as "first," "second," etc., may be used herein to describe various elements, the elements are not limited by these terms. These terms are generally used to distinguish one element from another.

When an element is described as being "coupled" or "connected" to another element, the element may be directly coupled or connected to the other element. However, it should also be understood that another element may be present therebetween. In contrast, when an element is described as being "directly coupled" or "directly connected" to another element, it should be understood that there are no other elements therebetween.

A singular expression includes the plural form unless the context clearly dictates otherwise.

In the present specification, it should be understood that the term such as "include" or "have" is intended to designate the presence of features, numbers, steps, operations, elements, parts, or combinations thereof described in the specification, and does not preclude the possibility of addition or presence of one or more other features, numbers, steps, operations, elements, parts, or combinations thereof.

Furthermore, the term "unit" or "control unit" included in the names of a hybrid control unit (HCU), a motor control unit (MCU), etc. is merely a widely used term for naming a controller that is configured to control a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Hereinafter, various embodiments of the present disclosure will be described in detail with reference to FIG. 1, FIG. 2, FIG. 3, and FIG. 4.

FIG. 1 is a block diagram illustrating a configuration of a control transition system for an autonomous vehicle according to an exemplary embodiment of the present disclosure.

Referring to FIG. 1, a control transition system for an autonomous vehicle according to various exemplary embodiments of the present disclosure may include a driver monitoring unit 200 configured to monitor a gaze of a driver and identify a position of a hand of the driver; an automated-driving-level switching unit 400 configured to determine a need for a transition of an automated driving control based on whether a driving environment of the vehicle which is performing automated driving while being controlled by an automated driving system is changed and whether the driver is intervened, and determine an automated driving level to which an automated driving level is to be switched based on a driver monitoring result obtained by the monitoring; and an automated driving control unit 500 configured to restrictively perform vehicle control within a range of the switched automated driving level.

The control transition system may further include a driving environment recognition unit 100 configured to recognize the driving environment around the vehicle which is performing automated driving while being controlled by the automated driving system using at least one sensor or map information; and a driving pattern determining unit 300 configured to determine a driving pattern of the driver based on a past driving history associated with driving performed by the driver in the past during automated driving of level 3 or higher.

Furthermore, the control transition system may further include an automated-driving-level display unit 600 configured to display information on the automated driving level through an output means such as an audio, video, and navigation (AVN) system, a cluster, or a head-up display (HUD) provided in the vehicle.

The driving environment recognition unit 100 may be configured to determine the driving environment around the autonomous vehicle, using data obtained from at least one sensor such as a radar sensor, a Light Detection and Ranging (LiDAR) sensor, an ultrasonic sensor, or a camera provided in the autonomous vehicle.

In the instant case, the driving environment recognition unit 100 may recognize the driving environment around a road on which the vehicle is autonomously traveling by identifying lanes, intersections, crosswalks, or the like based on a current location of the vehicle, from the map information provided in the autonomous vehicle.

Accordingly, the driving environment recognition unit 100 may recognize the presence and location of lanes, intersections, crosswalks, or the like, and may also recognize the driving environment around the autonomous vehicle including, for example, pedestrians, motorcycles, stationary objects, emergency vehicles, or the like.

The driving environment identified by the driving environment recognition unit 100 may be used as data for the automated-driving-level switching unit 400 to determine the need to switch the automated driving level.

Furthermore, the driver monitoring unit 200 may monitor the gaze and the hand position of the driver using the camera and the sensor provided in the vehicle to determine whether the driver in the vehicle is when they are able to take over a vehicle control for controlling the vehicle during automated driving of level 3 (Lv. 3) or higher.

For example, the driver monitoring unit 200 may be configured to determine whether the driver is looking ahead based on a direction of the gaze of the driver determined from an image captured by an indoor camera provided in the vehicle.

Furthermore, the driver monitoring unit 200 may be configured to determine whether the hand of the driver is holding a steering wheel based on a detected signal from a sensor provided in the steering wheel of the vehicle.

Furthermore, the driving pattern determining unit 300 may derive the driving pattern of the driver by accumulating and learning data on the past driving history associated with driving performed by the driver in the past during automated driving of level 3 (Lv. 3) or higher.

Accordingly, the driving pattern determining unit 300 may be configured to determine how rapidly and stably the driver takes over the control without a dangerous situation occurring in the situation where automated driving of level 3 (Lv. 3) or higher is canceled.

Furthermore, the driving pattern determining unit 300 may be configured to determine whether the driver tends to forcibly take over the control by overriding automated driving of level 3 (Lv. 3) or higher.

To the present end, the driving pattern determining unit 300 may be configured to determine the driving pattern of the driver in the situation where automated driving is canceled based on whether there is a change in acceleration or deceleration according to manipulation of an accelerator pedal by the driver and on whether there is a change in a steering angle according to manipulation of the steering wheel by the driver, while being controlled by the automated driving system.

Furthermore, each time that a transition of the control is determined to be needed and a control transition demand (TD) occurs, the driving pattern determining unit 300 may store, in a data storage system for automated driving (DS-SAD), a control TD occurrence history including, for example, whether the control TD occurs due to the driver's fault.

Furthermore, when the control TD occurs due to the driver's fault, the driving pattern determining unit 300 may impose a penalty when determining the driving pattern of the driver. For example, after assigning a score relating to the driving pattern of the driver as a reference score, the driving pattern determining unit 300 may subtract a preset value from the reference score each time the penalty is imposed and use a remaining score after the subtraction as a criterion for determining the driving pattern of the driver.

Accordingly, when the driver is looking ahead and the hand of the driver is on the steering wheel as a result of monitoring the driver, the driving pattern determining unit 300 may be configured to determine that the driver is ready to take over the control, assign the reference score of a current state, and subtract a score corresponding to the penalty determined based on the past driving pattern of the driver.

In the instant case, the driving pattern determining unit 300 may set the score corresponding to the penalty to be subtracted from the reference score, based on the number and frequency of occurrences of the control TD due to the driver's fault in the past which is stored in the DSSAD. That is, the driving pattern determining unit 300 may determine, as data for determining the driving pattern of the driver, a sum of a value of "current state+score" and a value of "−past driving history-based penalty".

Furthermore, when the autonomous vehicle is a fleet vehicle in which the driver changes frequently, and the data stored in the DSSAD and information on the driver are linkable to each other, the driving pattern determining unit 300 may be configured to determine the penalty based solely on a history of TD occurrences by the fault of a corresponding driver.

Furthermore, when there is a need to switch a subject having the control for the vehicle from the system to the driver during automated driving of level 3 (Lv. 3) or higher, the automated-driving-level switching unit 400 may be configured to determine an automated driving level to which the automated driving level of the vehicle is to be switched stably according to a response of the driver when determining which level the automated driving level is switched to.

To the present end, the automated-driving-level switching unit 400 may include a control transition determiner 410 configured to determine whether there is a need to transfer the control for the autonomous vehicle from the automated driving system to the driver; a driver-state determiner 420 configured to determine whether the driver is in a state where they are able to take over the control for the vehicle based on the driver monitoring result; and a switching-level determiner 440 configured to determine the automated driving level to be level 1 (Lv. 1) when two conditions that the gaze of the driver is at the front side and the hand of the driver is on the steering wheel are not satisfied based on the driver monitoring result, and for determining the automated driving level to be level 2 (Lv. 2) when the two conditions are both satisfied.

In the instant case, as shown in FIG. 4, when it is determined that the autonomous vehicle deviates from a condition of an operational design domain (ODD) set by a vehicle manufacturer to apply to the automated driving level of level 3 (Lv. 3) or higher, or the driving environment of the vehicle deviates from a preset driving condition, the control transition determiner 410 may be configured to determine that an ODD condition or a driving condition under which the automated driving system includes the control for the vehicle is changed, and the control transition to the driver is required.

In the instant case, as an example of the case where the ODD condition is changed, there is a case where the speed of the vehicle which is performing automated driving of level 3 (Lv. 3) exceeds a speed set as a speed limit for level 3 (Lv. 3) (e.g., 60 kilometers per hour (kph)), and such a case may be determined to require the control transition.

Furthermore, as an example of the case where the driving condition is changed, there is a case where the driving environment obtained by the driving environment recognition unit 100 does not satisfy a driving condition set by the vehicle manufacturer as a driving environment for level 3 (Lv. 3) or higher, and such a case may be determined to require the control transition.

In the instant case, as an example of the driving condition set as the driving environment for level 3 (Lv. 3) or higher, various conditions may be set, for example, conditions under which lanes are recognizable, there are no intersections or crosswalks in front, there are no pedestrians or motorcycles, there are no stationary objects around, and there are no emergency vehicles, as shown in FIG. 4.

Furthermore, when it is determined that the control transition is required, the driver-state determiner 420 may be configured to determine whether the driver is looking ahead and whether the hand of the driver is on the steering wheel based on the driver monitoring result.

Accordingly, the driver-state determiner 420 may be configured to determine whether the driver is in a state where they are able to immediately control the vehicle when the control is transferred.

When it is determined that any one of the two conditions that the driver holds the steering wheel while looking ahead is not satisfied (i.e., "No" as a result of determining a state of the driver, refer to FIG. 4), the switching-level determiner 440 may be configured to determine the automated driving level to be level 1 (Lv. 1).

When it is determined that the two conditions are both satisfied, as the driver holds the steering wheel while looking ahead after the automated driving level is determined to be level 1 (Lv. 1), the switching-level determiner 440 may also switch the automated driving level to level 2 (Lv. 2).

Furthermore, when it is determined that the two conditions that the driver holds the steering wheel while looking ahead are both satisfied (i.e., "Yes" as a result of determining a state of the driver, refer to FIG. 4), the switching-level determiner 440 may be configured to determine the automated driving level to be level 2 (Lv. 2).

In the instant case, the automated-driving-level switching unit 400 may further include a driving pattern applier 430 configured to correct the automated driving level based on the past driving pattern of the driver derived by the driving pattern determining unit 300.

The driving pattern applier 430 may be configured to determine the automated driving level to be level 2 (Lv. 2) when the score determined by subtracting the penalty derived based on the past driving history by the driving pattern determining unit 300 from the value set as the reference score exceeds a preset value, and correct the automated driving level to be level 1 (Lv. 1) when the score is less than or equal to the preset value.

For example, as shown in FIG. 4, the score may be determined by setting a reference score indicating a current state as 100 scores having a positive (+) value and determining a sum of the reference score and a penalty having a negative (−) value according to a past driving history.

For example, as shown in FIG. 4, when the score determined by setting, as 50 points, a reference score at which the automated driving level is to be corrected is between 50 and 100 points, the driving pattern applier 430 may switch the level to level 2 (Lv. 2), and when the determined score is less than 50 points, the driving pattern applier 430 may perform the correction to switch the level to level 1 (Lv. 1). In the instant case, the reference score which is a reference for correcting the automated driving level may also be set to other values.

Furthermore, when the determined score is less than or equal to 30 points, the driving pattern applier 430 may perform the correction to switch the level to level 1 (Lv. 1) and may also output an intensified warning that notifies the driver of this.

Furthermore, the automated-driving-level switching unit 400 may further include an override determiner 450 configured to determine the automated driving level based on a tendency of the driver stored in the driving pattern determining unit 300, when it is determined that the driver overrides themselves during automated driving of level 3 (Lv. 3) or higher and the control transition is thus required.

The override determiner 450 may be configured to determine the automated driving level to be level 1 (Lv. 1) when it is determined that the driver has an aggressive driving tendency to change lanes or accelerate or decelerate while overriding frequently, and determine the automated driving level to be level 2 (Lv. 2) when it is determined that the driver has a defensive driving tendency to drive conservatively while keeping a lane.

Furthermore, the automated-driving-level display unit 600 may display information on the automated driving level determined by the automated-driving-level switching unit 400 through various output means such as an AVN system, a cluster, or a HUD provided in the vehicle, to allow the driver to visually or audibly perceive the information on the determined automated driving level.

That is, the driver does not need to look ahead during automated driving of level 3 (Lv. 3) or higher, and thus there may need a more active way of allowing the driver to recognize a situation where it is determined that the control transition is required inside the vehicle and the control TD has thus occurred.

Accordingly, it may be desirable for the automated-driving-level display unit 600 to display the information through the AVN system, the cluster, or the HUD so that the driver clearly recognizes the occurrence of a situation where the automated driving level is switched and the automated driving level to which the automated driving level is to be switched.

For example, the automated-driving-level display unit 600 may operate in conjunction with internal mood lights or seat haptics in addition to the AVN system or cluster so that the driver rapidly recognizes the control transition and the automated driving level.

Figure 2:
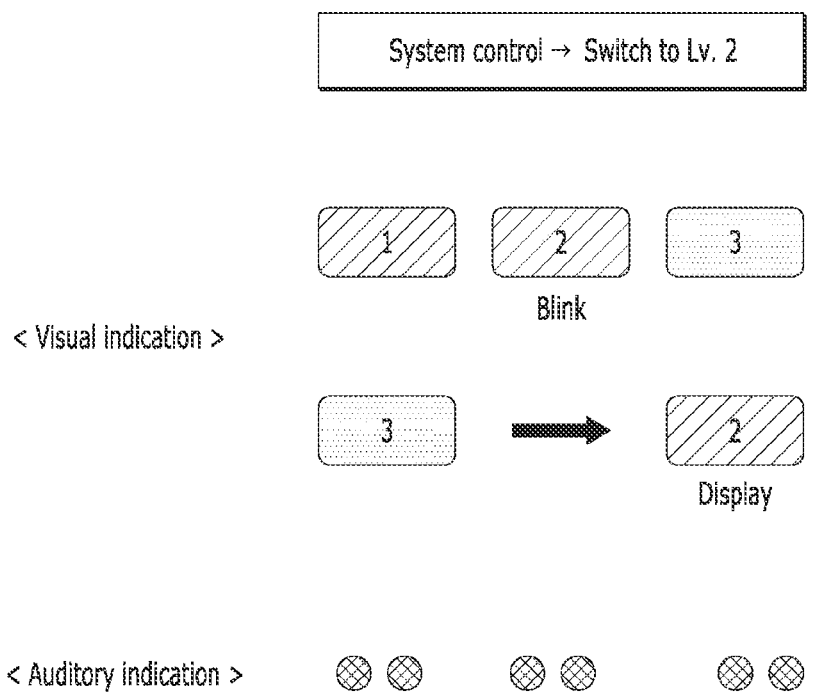
FIG. 2 is a diagram illustrating examples of visual and auditory indications of switching an automated driving level from level 3 to level 2 according to an exemplary embodiment of the present disclosure.
Figure 3:
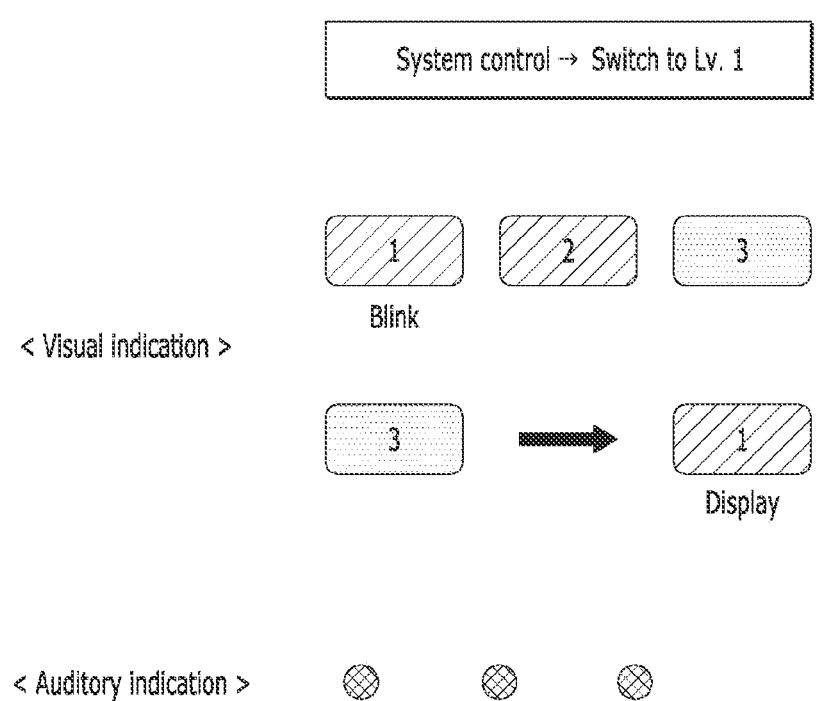
FIG. 3 is a diagram illustrating examples of visual and auditory indications of switching an automated driving level from level 3 to level 1 according to an exemplary embodiment of the present disclosure.

Examples of displaying the automated driving level by the automated-driving-level display unit 600 are shown in FIG. 2 and FIG. 3. For example, intuitive recognition may be made possible by blinking level 2 (Lv. 2) or level 1 (Lv. 1) which is the automated driving level while keeping level 3 (Lv. 3) which is a current automated driving level lit on (e.g., a light-on state is indicated by dots inside and a light-off state is indicated by hatched lines in FIG. 2). Furthermore, only the current automated driving level (Lv. 3) and the automated driving level (Lv. 2 or Lv. 1) may be clearly displayed.

Furthermore, the automated-driving-level display unit 600 may output the automated driving level so that the driver auditorily recognizes it by use of a warning sound such as a beeping sound with specific time intervals.

In the present way, notifying the driver of which level is to be switched by the automated-driving-level display unit 600 during a control transition process may minimize potential confusion which may occur when the driver takes over the control.

Hereinafter, a control transition method for an autonomous vehicle according to another exemplary embodiment will be described with reference to FIG. 5.

Figure 5:
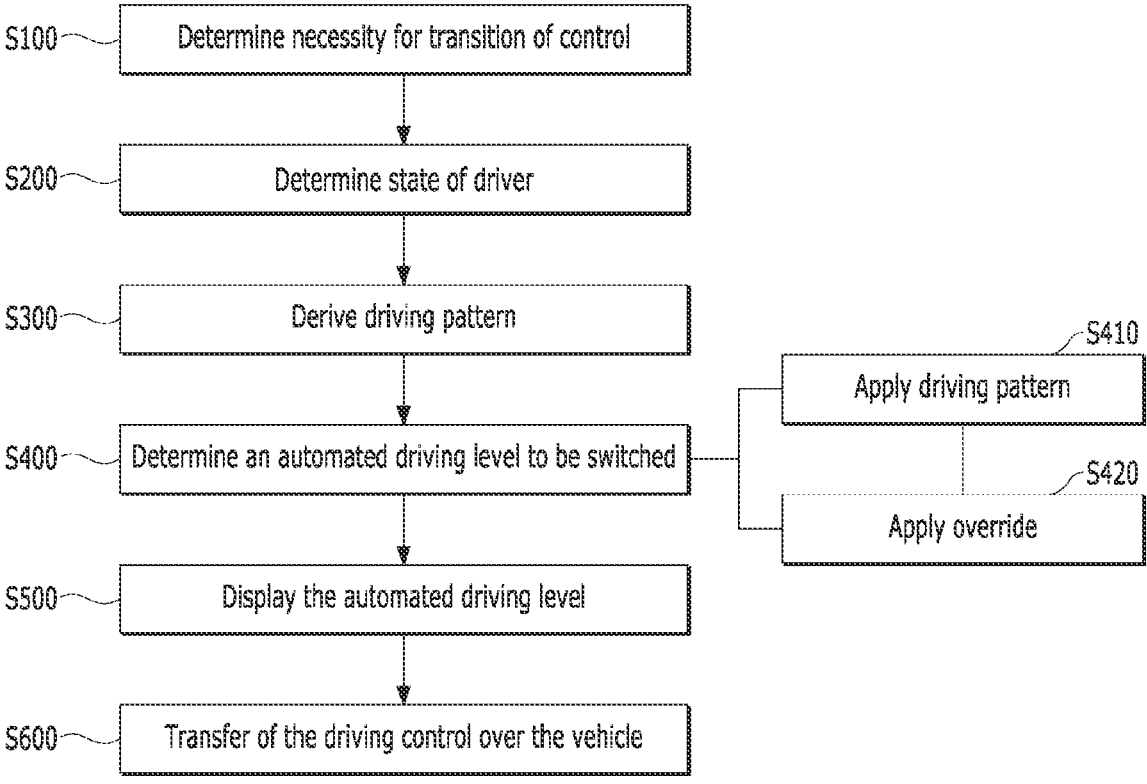
FIG. 5 is a diagram illustrating a control transition method for an autonomous vehicle according to another exemplary embodiment of the present disclosure.

Referring to FIG. 5, the control transition method for an autonomous vehicle may include an automated driving control transition necessity determining step S100 to determine whether there is a need to transfer a control for the vehicle which is performing automated driving from an automated driving system to a driver of the vehicle based on the vehicle which is performing automated driving and a driving environment around the vehicle; a driver's current state determining step S200 to determine a current state of the driver by monitoring a gaze of the driver and determining a hand position of the driver when it is determined that there is a need for a transition of the automated driving control; and an automated driving level determining step S400 to determine an automated driving level to which an automated driving level of the vehicle is to be switched based on a driver monitoring result obtained by the monitoring.

The control transition method may further include an automated-driving-level displaying step S500 to display information on the automated driving level through an AVN system provided in the vehicle; and an automated driving control transition step S600 to switch the automated driving level of the vehicle to the determined automated driving level and then restrictively performing vehicle control within a range of the switched automated driving level.

In the automated driving control transition necessity determining step S100, when it is determined that the vehicle performing automated driving deviates from an ODD condition set by a vehicle manufacturer or the driving environment of the vehicle deviates from a preset driving condition, it may be determined that the ODD condition or the driving condition under which the automated driving system has the right to control the vehicle has changed and there is thus a situation requiring the transition of the control through which the control is transferred to the driver.

In the instant case, the case where the ODD condition is changed may include, for example, a case where the speed of the vehicle performing automated driving exceeds a set speed, and the case where the driving condition is changed may include, for example, a case where a driving environment obtained from at least one sensor or map information provided in the vehicle does not satisfy a preset driving condition set by the vehicle manufacturer.

In the driver's current state determining step S200, whether the driver is looking ahead and whether the hand of the driver is on a steering wheel of the vehicle, in a current state in which the control transition is determined to be required, may be determined.

In the witching automated driving level determining step S400, the automated driving level may be determined to be level 1 (Lv. 1), when it is determined that any one of the two conditions that the driver holds the steering wheel with the hand while looking ahead is not satisfied.

Furthermore, in the automated driving level determining step S400, the automated driving level may be determined to be level 2 (Lv. 2), when it is determined that the two conditions that the driver holds the steering wheel with the hand while looking ahead are both satisfied.

In the automated driving level determining step S400, the automated driving level may be corrected based on a past driving pattern of the driver.

To the present end, the control transition method may further include a driver's driving pattern determining step S300 to derive a driving pattern of the driver by accumulating and learning data on a past driving history associated with driving performed by the driver in the past in a situation of automated driving of level 3 (Lv. 3) or higher.

In the driver's driving pattern determining step S300, whether the driver is able to take over the control rapidly and stably without causing danger when automated driving of level 3 (Lv. 3) is to be canceled, or whether the driver tends to forcibly transfer the control by overriding may be determined.

In the driver's driving pattern determining step S300, when a control TD occurred due to the driver's fault during automated driving in the past, a penalty may be imposed when determining the driving pattern of the driver.

Accordingly, a predetermined reference score may be assigned as a score for the driving pattern of the driver, and a preset value may be subtracted from the reference score each time the penalty is imposed, and then a remaining score after the subtraction may be used as a determination criterion for deriving a current driving pattern of the driver.

Furthermore, in the driver's driving pattern determining step S300, whether the driver has an aggressive driving tendency to change lanes or accelerate or decelerate while frequently overriding, or whether the driver has a defensive driving tendency to conservatively drive while keeping a lane may be determined.

When the driving pattern of the driver is derived as described above, the automated driving level determining step S400 may further include a driving pattern applying step S410 to correct the automated driving level based on the past driving pattern of the driver derived in the driver's driving pattern determining step S300.

In the driving pattern applying step S410, the automated driving level may be determined to be level 2 (Lv. 2) when a score which is determined by subtracting the penalty determined based on the past driving history of the driver from the reference score assigned to the current state of the driver (i.e., a state where both the conditions for the driver to look ahead and hold the steering wheel with the hand are satisfied) exceeds a preset value, and the automated driving level may be corrected to be level 1 (Lv. 1) when the score is less than or equal to the preset value.

Furthermore, the automated driving level determining step S400 may further include an override applying step S420 to correct the automated driving level based on an override driving tendency of the driver derived in the driving pattern determining step S300.

In the override applying step S420, the automated driving level may be determined to be level 1 (Lv. 1) when it is determined that the driver has an aggressive driving tendency to change lanes or rapidly accelerate or decelerate while frequently overriding, and the automated driving level may be determined to be level 2 (Lv. 2) when it is determined that the driver has a defensive driving tendency to drive conservatively while keeping a lane.

In the automated-driving-level displaying step S500, information on the automated driving level determined in the automated driving level determining step S400 may be displayed through an output means such as, for example, an AVN system, a cluster, or an HUD provided in the vehicle, to allow the driver to visually or auditorily recognize the information.

Furthermore, in the automated-driving-level displaying step S500, to draw the attention of the driver who is not looking ahead, operations may be performed in conjunction with internal mood lights or seat haptics, in addition to the output means such as the AVN system, the cluster, or the HUD so that the driver rapidly recognizes the control transition and the automated driving level.

In the automated driving control transition step S600, after the automated driving level is switched to the automated driving level, vehicle control may be restrictively performed within a range of the switched automated driving level.

The present disclosure described above may be embodied as computer-readable code on a medium in which a program is recorded. The computer-readable medium includes all types of recording devices in which data readable by a computer system is stored. Examples of the computer-readable medium include a Hard Disk Drive (HDD), a solid-state drive (SSD), a silicon disk drive (SDD), a read-only memory (ROM), a random-access memory (RAM), a CD-ROM, a magnetic tape, a floppy disk, an optical data storage device, etc.

Furthermore, the term "unit" or "control unit," as like included in a hybrid control unit, is only a widely used term for a name of a controller configured for controlling a specific function of a vehicle, and does not mean a generic function unit. For example, each unit or control unit may include a communication device configured to communicate with another control device or sensor to control a function assigned thereto, a memory configured to store an operating system or logic command input/output information, and one or more processors configured to perform determination, calculation, decision, etc. necessary for controlling the function assigned thereto.

The scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

The term "and/or" may include a combination of a plurality of related listed items or any of a plurality of related listed items. For example, "A and/or B" includes all three cases such as "A", "B", and "A and B".

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An automated driving system of a vehicle, the system comprising:

a driver monitoring unit configured to perform at least one of monitoring a gaze of a driver and determining a position of a hand of the driver;

an automated-driving-level switching unit configured to determine whether a transition of a driving control over the vehicle is required based on whether driving environment of the vehicle has changed during the vehicle being driven under control of the automated driving system, and to determine an automated driving level to be switched based on a result of the performing by the drive monitoring unit;

an automated driving control unit configured to control the vehicle according to the automated driving level;

a driving pattern determining unit configured to determine a driving pattern of the driver based on a driving history of the driver associated with level 3 or higher than the level 3, wherein the level 3 is the automated driving level at which the automated driving system proactively controls the vehicle when two conditions are satisfied, but the automated driving system is able to request a take-over of the control of the vehicle by the driver; and a driving pattern applier configured to adjust the automated driving level based on the driving pattern of the driver, wherein the driving pattern applier is configured to determine the automated driving level to be the level 2 when a first score determined by subtracting a penalty score determined by the driving pattern determining unit based on the driving history of the driver from a predetermined reference score exceeds a preset value, and to adjust the automated driving level to be the level 1 when the first score is less than or equal to the preset value.

2. The automated driving system of claim 1, further including a driving environment recognition unit configured to recognize the driving environment using at least one sensor provided in the vehicle or map information.

3. The automated driving system of claim 1, further including an automated-driving-level display unit configured to display information on the automated driving level through an audio video navigation (AVN) system, a cluster, or a head-up display (HUD) provided in the vehicle.

4. The automated driving system of claim 1, wherein the driving pattern determining unit is further configured to determine the driving pattern of the driver based on whether there is a change in acceleration or deceleration according to operation of an accelerator or a brake pedal of the driver and a change in a steering angle according to operation of a steering wheel of the driver when the driving control of the automated driving system over the vehicle is terminated.

5. The automated driving system of claim 1, wherein the driving pattern determining unit is further configured to store an occurrence history of a control transition demand (TD) in a data storage system for automated driving (DSSAD) whenever the control TD occurs.

6. The automated driving system of claim 1, wherein the driving pattern determining unit is further configured to determine a penalty score based solely on the occurrence history of the control TD which is occurred due to a fault of the driver when the vehicle is a fleet vehicle and data stored in DSSAD is able to be associated with information of the driver.

7. The automated driving system of claim 1, wherein automated-driving-level switching unit includes:

a control transition determiner configured to determine to transfer the control for the vehicle from the automated driving system to the driver;

a driver-state determiner configured to determine whether the driver is in a state where the driver is able to take over the control for the vehicle based on the result of the performing by the drive monitoring unit; and a switching-level determiner configured to determine the automated driving level to be level 1 when one of the two conditions that the gaze of the driver is directed forward and that the hand of the driver is on a steering wheel is not satisfied based on the result of the performing by the drive monitoring unit, and to determine the automated driving level to be level 2 when the two conditions are satisfied, wherein the level 1 is a driver assisting level at which driving speed and direction of the vehicle are under control of the driver while predetermined functions including speed or lane keeping are under control of the automated driving system, and wherein the level 2 is a partially automated level at which the driver is always required to focus on a situation around the driver while steering and acceleration or deceleration of the vehicle is under control of the automated driving system under predetermined conditions.

8. The automated driving system of claim 1, wherein automated-driving-level switching unit further includes an override determiner configured to determine the automated driving level based on tendency information of the driver which is stored by the driving pattern determining unit when there is a control TD occurred due to the driver's overriding the automated driving system while the vehicle being driven in the level 3 or higher than the level 3.

9. The automated driving system of claim 8, wherein the override determiner is further configured to determine the automated driving level to be the level 1 when it is determined that the driver has an aggressive driving tendency to change lanes or accelerate or decelerate while overriding, and determine the automated driving level to be the level 2 when it is determined that the driver has a defensive driving tendency to drive while keeping a lane.

10. A control transition method for a vehicle, the method comprising:

determining to transfer a control over the vehicle from an automated driving system to a driver of the vehicle based on a state of the vehicle and a driving environment around the vehicle;

determining a current state of the driver by monitoring a gaze of the driver and determining a position of a hand of the driver according to a result of the determining to transfer the control; and determining an automated driving level to be switched based on a result of the monitoring in the determining of the current state of the driver and controlling the vehicle according to the automated driving level adjusted based on a driving pattern of the driver; and determining the driving pattern of the driver based on a driving history of the driver associated with level 3 or higher than the level 3, wherein the level 3 is the automated driving level at which the automated driving system proactively controls the vehicle without two conditions not being satisfied, but the automated driving system is able to request a take-over of the control of the vehicle by the driver, wherein the determining of the driving pattern includes:

assigning a preset penalty when there is a control transition demand (TD) occurred due to a fault of the driver during the vehicle being driven under control of the automated driving system in the past;

assigning a predetermined reference score as a score of the driving pattern of the driver;

subtracting from the predetermined reference score a preset value each time the penalty is assigned; and using a remaining score after the subtracting as a criterion for determining a current driving pattern of the driver.

11. A non-transitory computer-readable storage medium storing a program for executing the control transition method for the autonomous vehicle of claim 10.

12. The control transition method of claim 10, wherein the determining of the driving pattern further includes determining the driving pattern of the driver based on whether the driver has an aggressive driving tendency to change lanes or accelerate or decelerate while overriding during automated driving, or the driver has a defensive driving tendency to drive while keeping a lane.

13. The control transition method of claim 10, wherein the determining of the automated driving level includes:

determining the automated driving level to be level 1 when one of the two conditions that the gaze of the driver is directed forward and that the hand of the driver is on a steering wheel is not satisfied; and determining the automated driving level to be level 2 when the two conditions are satisfied, wherein the level 1 is a driver assisting level at which driving speed and direction of the vehicle are under control of the driver while predetermined functions including speed or lane keeping are under control of the automated driving system, and wherein the level 2 is a partially automated level at which the driver is always required to focus on a situation around the driver while steering and acceleration or deceleration of the vehicle is under control of the automated driving system under predetermined conditions.

14. The control transition method of claim 13, wherein the determining of the automated driving level further includes:

applying the driving pattern to adjust the automated driving level based on the driving pattern of the driver; or applying an override to adjust the automated driving level based on an override driving tendency of the driver.

15. The control transition method of claim 14, wherein the applying of the driving pattern includes determining the automated driving level to be the level 2 when a first score determined by subtracting a penalty score determined based on the driving history of the driver from a reference score assigned to a state where the two conditions are satisfied exceeds a preset value, and adjusting the automated driving level to be the level 1 when the first score is less than or equal to the preset value, and wherein the applying of the override includes determining the automated driving level to be the level 1 when it is determined that the driver has an aggressive driving tendency to change lanes or accelerate or decelerate while overriding frequently, and determining the automated driving level to be the level 2 when it is determined that the driver has a defensive driving tendency to drive while keeping a lane.

* * * * *